A. L. BOGGS.
INVERTED BOTTLE COOLER.
APPLICATION FILED DEC. 8, 1910.
991,417.
Patented May 2, 1911.
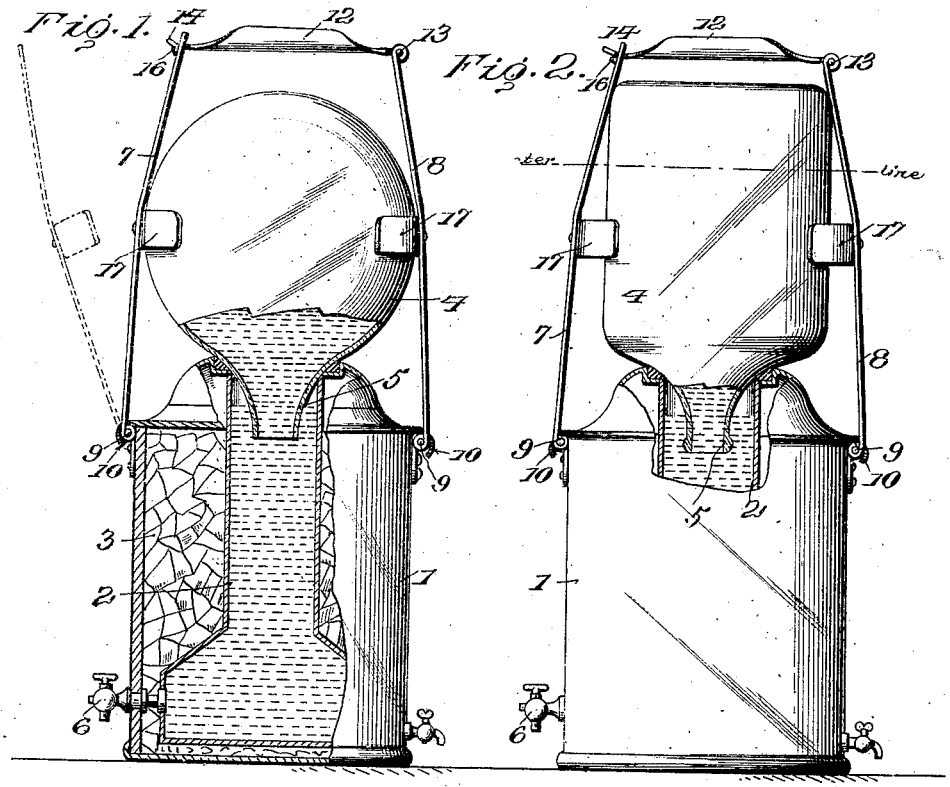
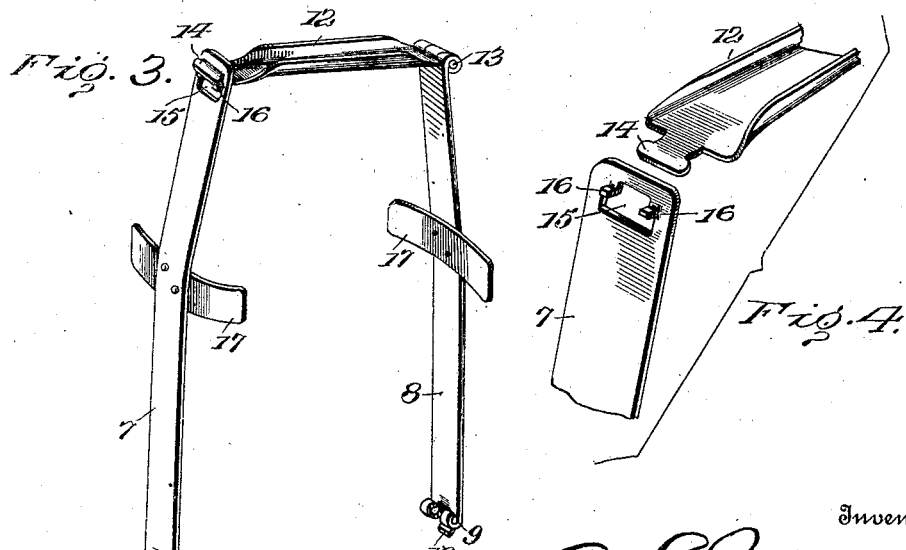
Witnesses
W. A. Williams
H. A. Pattison
Inventor
A. L. Boggs,
By A. Pattison
Attorney

UNITED STATES PATENT OFFICE.

ATWOOD L. BOGGS, OF BOSTON, MASSACHUSETTS.

INVERTED-BOTTLE COOLER.

991,417.  Specification of Letters Patent.  Patented May 2, 1911.

Application filed December 8, 1910. Serial No. 596,307.

*To all whom it may concern:*

Be it known that I, ATWOOD L. BOGGS, a citizen of the United States, residing at Boston, in the county of Suffolk and State of Massachusetts, have invented certain new and useful Improvements in Inverted-Bottle Coolers, of which the following is a specification, reference being had therein to the accompanying drawing.

This invention relates to improvements in inverted bottle coolers, and the object of the invention is to provide means for conveniently lifting and moving the cooler around without danger of displacing the position of the bottle or injury to any of the parts.

In the accompanying drawings—Figure 1 is a view partly in section and partly in side elevation of an inverted bottle cooler with my improvement attached thereto and shown in connection with a spherical type of bottle. Fig. 2 is a similar view showing my invention applied to the ordinary form of bottle. Fig. 3 is a detached perspective view of my improvement. Fig. 4 is a fragmentary perspective view of the handle and its detachable connection with one of the side bars or bails.

As is well known to those skilled in this art, the inverted bottle type of cooler comprises an outer case 1 and an inner receptacle 2. There is an ice receiving space 3 between the inner receptacle and the outer case 1. The inverted bottle 4 has its mouth or neck 5 extending through the open upper end of the inner receptacle 2 and the passage of the water or liquid from the bottle 4 into the inner receptacle is controlled by the well-known barometric principle. Water is withdrawn through a suitable faucet 6, which passes through the outer case 1 and into the lower portion of the inner receptacle 2.

In the type of inverted bottle cooler now in use the bottle 4 is unsupported except at its neck portion, and by reason of this fact the bottle is liable to topple off of the cooler and be broken or displaced.

My present improvement is to provide means which performs the double function of a support for the protection of the bottle and as a handle for moving the cooler around without any danger of displacing the bottle or having it topple over and become broken.

Referring now particularly to my improvement, it consists of two upwardly extending arms or bails 7 and 8. The lower ends of these bails are hinged to the outer case at the points 9, and are provided with stop lips or projections 10 adapted to limit the outward movement of the bails by engaging the outer side of the inclosing case 1, as shown in dotted lines at the left of Fig. 1. A suitable handle 12 has one end hinged to one of the bails and, as here shown, it is hinged at the point 13 to the bail 8. The opposite end of the handle 12 is detachably connected with the upper end of the bail 7. So far as my broad improvement is concerned, this detachable connection may be of any desired form, but as here shown, it consists of a T-shaped lip 14 on the free end of the handle 12, which is adapted to pass through a bayonet-shaped slot 15. At the side or sides of the narrow portion of the slot 15, the projections 16 extend outwardly so that when the free end of the handle 12 and the upper end of the bail 7 are interlocked, as shown in Fig. 1, the enlarged end of the T-shaped lip 14 will rest upon these projections 16.

For the purpose of holding the bottle 4 in place, each bail is provided with a suitably shaped member 17, which engages the outer side of the projecting portion of the bottle 4. This engagement is preferably of a yielding character and, as shown, both bails and the member 17 are capable of yielding and thus effecting a spring tension on the bottle, but it will be understood that either the members 17 alone or the bails alone may be of a yielding character and accomplish the same result. By reason of the spring tension engagement with the bottle, the interlocking portions of the bail 7 and the handle 12 will hold the enlarged end of the lip 14 over the projections 16, so there may be a downward pressure on the handle 12 without detaching it from the bail 7.

I wish it understood that there may be variations in the structure without departing from my present improvement, the primary object of which is to provide a combined handle and bottle support for an inverted bottle cooler.

Having thus described my invention, what I claim and desire to secure by Letters Patent is:

1. The combination with an inverted bottle cooler embodying an outer case and a bottle inverted on the upper end thereof, of combined lifting and bottle supporting bails hinged at their lower ends to an outer casing, a handle connecting the upper ends of the bails and detachably connected with one of the bails to permit them to move outward for the purpose described.

2. The combination with an inverted bottle cooler embodying an outer case and a bottle inverted on the upper end thereof, of combined vertically arranged lifting and bottle supporting members, one of said members adapted to have an outward movement and a handle detachably connecting the upper ends of the bails.

3. The combination with an inverted bottle cooler embodying an outer casing and a bottle inverted on the upper end thereof, of combined lifting and bottle supporting bails having their lower ends connected with the outer casing, one of the bails moving outwardly and a handle detachably connecting the ends of the bails, said connection comprising a T-shaped lip and a bayonet-shaped slot.

4. The combination with an inverted bottle cooler embodying an outer case and a bottle inverted on the upper end thereof, of combined lifting and bottle supporting members connected with the outer case, one of the members capable of outward movement, a handle connecting the upper ends of the bails by means of a detachable connection which comprises a T-shaped lip carried by the end of the handle, a bayonet-shaped slot in the end of the bail, and an outwardly projecting member carried by the bail at one side of the narrow portion of the bayonet slot.

5. The combination with an inverted bottle cooler embodying an outer casing and a bottle inverted on the upper end thereof, of vertically projecting combined carrying and bottle-supporting bails, the lower end of the bails hinged to the outer casing, said hinges comprising projections to limit the outward movement of the bails, and a handle detachably connecting the upper ends of the bails.

6. The combination with an inverted bottle cooler embodying an outer case and an inverted bottle supported at the upper end of the case, of a combined bottle support and handle projecting upward from the case and extending across over and apart from the bottle, the horizontal portion being free from the bottle to form a hand-hold, and the upwardly projecting portion supporting the bottle at its sides.

In testimony whereof I hereunto affix my signature in the presence of two witnesses.

ATWOOD L. BOGGS.

Witnesses:
CARLETON HUNNEMAN,
JAMES A. FARREL.

---

Copies of this patent may be obtained for five cents each, by addressing the "Commissioner of Patents, Washington, D. C."